United States Patent
Nath et al.

(10) Patent No.: US 12,118,546 B2
(45) Date of Patent: Oct. 15, 2024

(54) MACHINE LEARNING TECHNIQUES FOR REBUILDING TRANSACTIONS TO PREDICT CASH POSITION

(71) Applicant: Oracle Financial Services Software Limited, Goregaon (IN)

(72) Inventors: Mridul Kumar Nath, Bangalore (IN); Prajwal Patil, Bangalore (IN); Rupa Satyabodha Kolhar, Pune (IN); Anshul Kumar Jain, Pune (IN)

(73) Assignee: ORACLE FINANCIAL SERVICES SOFTWARE LIMITED, Goregaon (IN)

( * ) Notice: Subject to any disclaimer, the term of this patent is extended or adjusted under 35 U.S.C. 154(b) by 41 days.

(21) Appl. No.: 17/744,355

(22) Filed: May 13, 2022

(65) Prior Publication Data

US 2023/0368196 A1 Nov. 16, 2023

(51) Int. Cl.
  *G06Q 20/38* (2012.01)
  *G06Q 20/40* (2012.01)

(52) U.S. Cl.
  CPC ......... *G06Q 20/389* (2013.01); *G06Q 20/401* (2013.01)

(58) Field of Classification Search
  CPC .................................................. G06Q 20/389
  See application file for complete search history.

(56) References Cited

U.S. PATENT DOCUMENTS

2020/0034772 A1* 1/2020 Balan ...................... G06Q 10/06
2020/0349648 A1* 11/2020 Cosmano ............... G06Q 40/06

FOREIGN PATENT DOCUMENTS

CA    3107297    *    8/2023    ............. G06F 21/60

OTHER PUBLICATIONS

Startseva, A, et al., in "Analysis of Financial Payments Text Labels in the Dynamic Client Profile Construction," from IEEE, 2020 International Conference, 2020 (Year: 2020).*
Cash Flow Forecasting using Machine Learning for a Retail Group, Decision Brain, Available Online at: https://decisionbrain.com/cash-flow-forecasting/, Accessed from Internet on Jul. 1, 2022, 5 pages.

(Continued)

*Primary Examiner* — Olabode Akintola
*Assistant Examiner* — Brandon M Duck
(74) *Attorney, Agent, or Firm* — Kilpatrick Townsend & Stockton LLP

(57) ABSTRACT

Machine learning techniques are disclosed for rebuilding transactions to predict cash position. In one aspect a method includes obtaining data for an original transaction, classifying the original transaction into a class of multiple classes based on the data, predicting first tranche delay days for the original transaction based on the class and the data, predicting a tranche count for the original transaction based on the class and the data, predicting a tranche interval for the original transaction based on the class and the data; and rebuilding the original transaction as one or more future transactions based on the class, the first tranche delay days, the tranche count, and tranche interval. Each of the one or more future transactions comprise an updated amount of the original transaction, an updated date upon which the original transaction is anticipated, or both.

12 Claims, 9 Drawing Sheets

(56) References Cited

OTHER PUBLICATIONS

Corporate Treasury Solutions, Kamakura Corporation, Available Online at: https://www.kamakuraco.com/corporate-treasury/, Accessed from Internet on Jul. 1, 2022, 3 pages.

Modeling & Valuing Securitized Assets, Kamakura Corporation, Available Online at: https://www.kamakuraco.com/2015/02/10/modeling-valuing-securitized-assets/, Oct. 2, 2015, 13 pages.

Quantitative Risk Management, Available Online at: https://www.qrm.com/, Accessed from Internet on Jul. 1, 2022, 4 pages.

Appel et al., Optimize Cash Collection: Use Machine learning to Predicting Invoice Payment, arXiv:1912.10828, Available Online at: chrome-extension://efaidnbmnnnibpcajpcglclefindmkaj/https://arxiv.org/pdf/1912.10828.pdf, Dec. 2019, 9 pages.

Cheong et al., Customer Level Predictive Modeling for Accounts Receivable to Reduce Intervention Actions, Proceedings of the 14th International Conference on Data Science (ICDATA), 2018, pp. 23-29.

Cherniwchan, A Fully Automated Approach to Cash Flow Forecasting, Available Online at: https://medium.com/@kcherniwchan/a-fully-automated-approach-to-cash-flow-forecasting-29b3b0ef71f3#:~:text=At%20chata.ai%2C%20we',data%2C%20just%20by%20asking%20questions, Sep. 4, 2019, 11 pages.

Dadteev et al., Using Artificial Intelligence Technologies to Predict Cash Flow, Procedia Computer Science, vol. 169, 2020, pp. 264-268.

Lokmic et al., Cash Flow Forecasting Using Supervised and Unsupervised Neural Networks, Neural Networks, IJCNN, Proceedings of the IEEE-INNS-ENNS International Joint Conference, vol. 6, Feb. 2000, 5 pages.

Hu, Predicting and Improving Invoice-to-Cash Collection through Machine Learning, MIT Libraries, Available Online at: https://dspace.mit.edu/handle/1721.1/99584, Jun. 2015, 90 pages.

\* cited by examiner

| Date | Open Balance | Incoming | Outgoing | Close Balance |
|---|---|---|---|---|
| 1-Jan | 0 | 100 | 50 | 50 |
| 2-Jan | 50 | 0 | 75 | -25 |
| 3-Jan | -25 | 100 | 0 | 75 |
| 4-Jan | 75 | 55 | 0 | 130 |
| 5-Jan | 130 | 0 | 210 | -80 |
| 6-Jan | 200 | 0 | 170 | 30 |
| 7-Jan | 30 | 20 | 10 | 40 |
| 8-Jan | 40 | 0 | 100 | -60 |

FT Incoming | 1-Jan | 75 USD
Invoice Settlement | 1-Jan | 25 USD

Deposit Interest | 1-Jan | 50 USD

FIG. 1

MACHINE LEARNING TECHNIQUES FOR REBUILDING TRANSACTIONS TO PREDICT CASH POSITION

FIELD

The present disclosure relates generally to a transaction rebuilding system, and more particularly, to machine learning techniques for rebuilding transactions to predict cash position.

BACKGROUND

Various algorithms are used by machine learning systems to examine data, learn from the data, and make decisions based on what the systems learn from the data. Supervised algorithms include classification and regression algorithms, while un-supervised algorithms include clustering and association algorithms. Supervised algorithms provide a way of predicting future happenings between a dependent (target) and one or more independent variables (also known as a predictor). In other words, supervised algorithms provide a way of mathematically sorting out which of those variables does indeed have an impact. The independent variables are utilized by the model to explain or predict changes in the dependent variable. The dependent variable is what the model is attempting to explain or predict. Regression and classification have a wide range of real-life applications and are important for any machine learning problem that involves continuous numbers or decisions. This includes financial forecasting and sales forecasting, which would use regression algorithms, while weather analysis and sports predictions would use classification algorithms.

One particular real-life application is in predicting cash flow and cash position. Cash flow and cash position are very closely related. The biggest difference is that cash flow refers to the net change resulting over time from inflows and outflows of cash. A company's cash flow is depicted in its cash flow statement. This statement lays out the starting cash and ending cash for a given period. More importantly, it shows how cash was generated and how it was used. Operating activities, investing, financing and other tax-related transactions all contribute to cash flow. In general, a company wants a steady cash flow from its operating activities since these drive the business' profits over time. Cash position speaks specifically to a company's relative cash position at a particular moment in time. The cash position is a sign of financial strength and liquidity. In general, a stable cash position means the company can easily meet its current liabilities with the cash or liquid assets it has on hand. In addition to cash itself, cash flow and position often take into consideration highly liquid assets, such as certificates of deposit, short-term government debt, and other cash equivalents. Cash flow forecasting or projecting involves estimating a company's future sales and expenses. The cash flow projection is a vital tool for companies because it will tell a company if they have enough cash to run the business or expand it. The cash flow projection will also show the company when more cash is going out of the business than in or vice versa.

SUMMARY

Techniques are provided for rebuilding future transactions from a series of predicted transaction data generated from original transactions using machine learning techniques. In some instances, the rebuilt future transactions are used for predicting a cash position of a user or entity. Various embodiments are described herein, including methods, systems, non-transitory computer-readable storage media storing programs, code, or instructions executable by one or more processors, and the like.

In various embodiments, a method is provided comprising: receiving data for an original transaction, where the data comprises an amount of the original transaction, a date upon which the original transaction is anticipated, and a party, a counterparty, or both of the original transaction; classifying, using a machine learning classification model, the original transaction into a class of multiple classes based on the data, wherein the multiple classes represent temporal aspects of the original transaction; predicting, using a first machine learning regression model, first tranche delay days for the original transaction based on the class and the data; predicting, using a second machine learning regression model, a tranche count for the original transaction based on the class and the data; and rebuilding the original transaction as one or more future transactions based on the class, the first tranche delay days, and the tranche count, wherein each of the one or more future transactions comprise an updated amount of the original transaction, an updated date upon which the original transaction is anticipated, or both.

In some embodiments, the method further comprises predicting, using a third machine learning regression model, a tranche interval for the original transaction based on the class, the tranche count, and the data, wherein the original transaction is rebuilt as the one or more future transactions based on the class, the first tranche delay days, the tranche count, and the tranche interval.

In some embodiments, the multiple classes comprise on-time full settlement, early, and delay.

In some embodiments, the class of the original transaction is either early or delay, and in response to the class being early or delay, predicting the first tranche delay days for the original transaction, wherein the first tranche delay days are a positive number when the class is delay and the first tranche delay days are a negative number when the class is early.

In some embodiments, in response to the class being early or delay, predicting the tranche count for the original transaction.

In some embodiments, when the tranche count is greater than one, predicting, using a third machine learning regression model, a tranche interval for the original transaction based on the data, and the original transaction is rebuilt as the one or more future transactions based on the class, the first tranche delay days, the tranche count, and the tranche interval, and when the tranche count is equal to one, the tranche interval is not predicted, and the original transaction is rebuilt as the one or more future transactions based on the class, the first tranche delay days, and the tranche count.

In some embodiments, the method further comprises calculating a cash position based on the one or more future transactions.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 1 depicts an example of date wise net cash positions summed across transactions in accordance with various embodiments.

DETAILED DESCRIPTION

Figure 2:
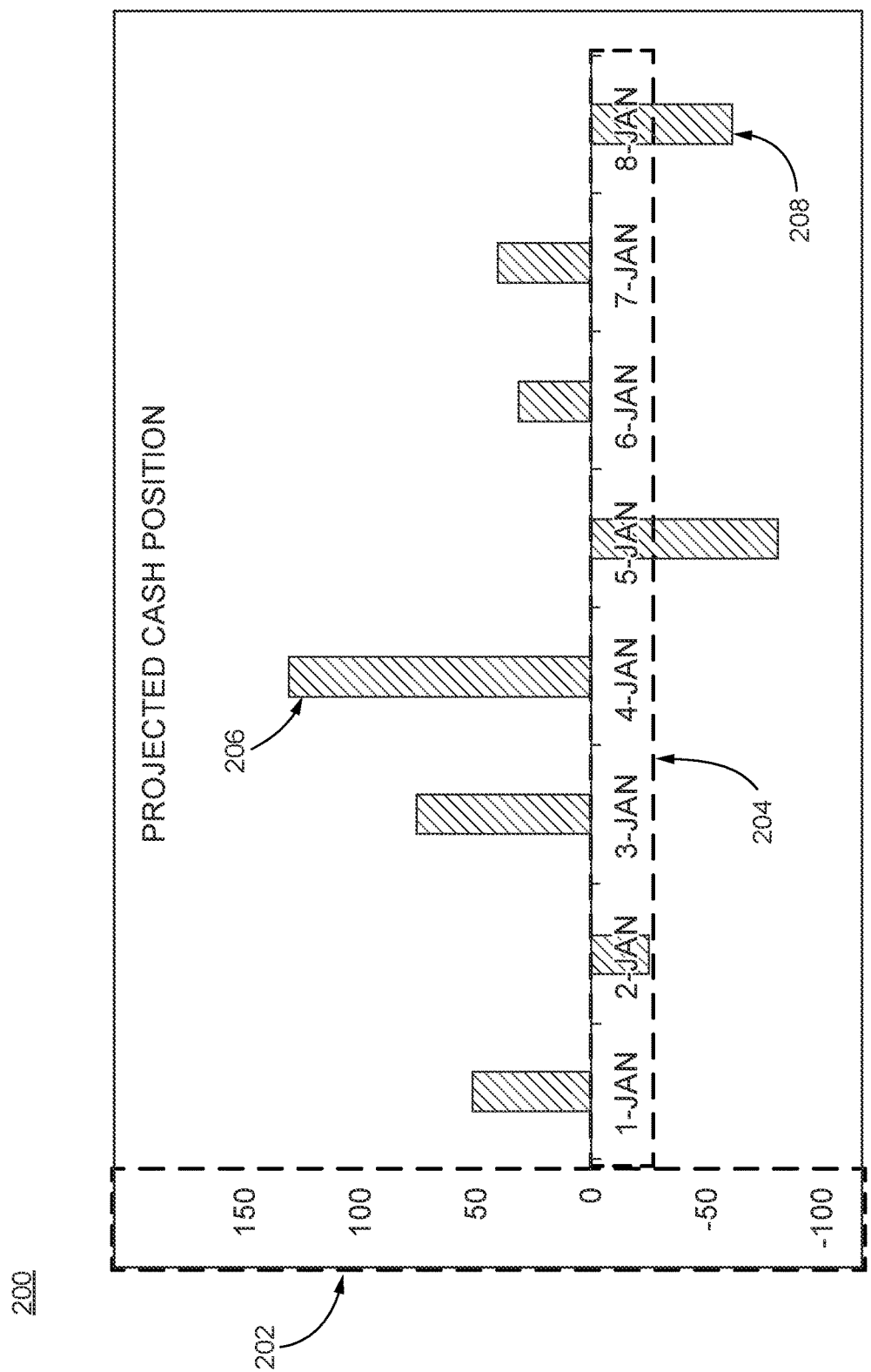
FIG. 2 depicts an example of date wise projected cash positions represented in graphical form in accordance with various embodiments.

The various embodiments described herein may be used in an assortment of different domains and contexts. Certain embodiments are particularly applicable to enterprise application software provided in distributed computing technology. However, the systems and methods described herein may be used to provide data transformation functionality for any system or application framework where one can ascertain how a change in the value of each independent variable affects the value of the dependent variable(s).

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Cash flow projections have always been used by banks to formulate strategies for covering future financial commitments. These date wise projections allow banks and financial institutions to evaluate cash availability which are then placed in the market—'placements' to generate income while shortfalls mandate market borrowings to meet commitments. The projections typically follow a simplified logic based on expected transactions on the committed dates. As shown in FIG. 1, transaction records 100 may be used by banks and financial institutions to display changes in cash position between dates. For example, the transaction records can include transaction data 104. The transaction records may include more than one transaction associated with the transaction date. Each transaction can be associated with more than one field 102. Fields 102 may include the date, open balance, incoming cash, outgoing cash, and close balance. In some examples, the "Date" in field 102 can represent the date that a transaction or transactions took place. The "Open Balance" in field 102 can represent the closing cash position from the previous transaction date, which will be the open balance for the current date. The "Incoming" in the field 102 can represent sum total of received cash income or incoming funds from other parties across multiple transaction records for a given date. The "Outgoing" in field 102 can represent sum total of paid cash or outflow of funds to other parties across multiple transaction records for a given date. The "Close Balance" in field 102 can represent a net cash position for a date. In one example, the "Close Balance" for a date can be calculated by subtracting the paid cash from the received cash income while considering the "Open Balance." As mentioned above, the transaction records can be used to display changes in cash position between each date. Thus, by calculating cash positions 106 for each transaction date with the transaction data 104, the changings in cash position across dates can be observed.

The closing balance constitutes the projected cash position for a given date. As shown in FIG. 2, projected cash positions 200 can be used by banks and financial institutions to see the final cash positions for each date. In FIG. 2, the projected cash position 200 can be expressed by the transaction date 204 when the transaction(s) took place and the corresponding cash position balance 202. In one implementation, the projected cash position of 200 can be presented in the bar chart shown as FIG. 2. In this way, the changings in cash positions can be clearly identified when referring to a specific transaction date. For example, the cash position balance 206 on "4-JAN" (i.e., January $4^{th}$) obviously has a positive balance position value in the projected cash positions 200. referring to the transaction records 100 in FIG. 1, the cash position balance 206 in the bar graph is the actual cash position 130. Another example the cash position balance 208 on "8-JAN" (i.e., January $8^{th}$) obviously has a negative balance position value in the projected cash positions 200. Similarly, referring to the transaction records 100 in FIG. 1, the cash position balance 208 in the bar graph is the actual cash position of −60.

An important aspect of this widely accepted industry practice is the presumption that all payments that are anticipated to be received by the future due dates (i.e., provisioned payment dates) will be honored in accordance with their provisioned amounts and dates. However, this rarely occurs in the real world, which is the main reason for the large variance between the projected and actual cash positions. Existing solutions for cash flow projections have largely focused on either predicting the likelihood of an invoice being late or whether an invoice will be paid on time or not and estimating the magnitude of the delay. Other known approaches include using forecasting techniques like time-series e.g., autoregressive integrated moving average (ARIMA), regression models and/or neural network models, to directly predict incoming and outgoing cash flows for the next couple of months. Some of these solutions are limited to a specific transaction type, such as invoices or cheques. However, these approaches do not address the reality that a bank or financial institution may have multiple transaction types that constitutes their inflows and outflows.

In order to overcome these challenges and others, various techniques disclosed herein attempt to minimize the variance between the projected cash position and the actual cash position by rebuilding the basic transactions instead of the traditional approach of solely focusing on trying to predict probability of delay and/or the magnitude of delay. More specifically, unlike the traditional approaches, the present techniques utilize the pivots of time, spread and interval and seek to answer the following questions:

Time: Will the future schedule payment be
  on time
  before time
  or delayed
Spread: If the future payment is predicted to be settled
  By a single tranche of full payment
  Spread across multiple tranches
Interval: The interval of time between multiple tranche payments In one embodiment, a method for rebuilding a transaction is provided that includes: obtaining data for an original transaction, where the data comprises an amount of the original transaction, a date upon which the original transaction is anticipated, and a party, a counterparty, or both of the original transaction; classifying, using a machine learning classification model, the original transaction into a class of multiple classes based on the data, wherein the multiple classes represent temporal aspects of the original transaction; predicting, using a first machine learning regression model, first tranche delay days for the original transaction based on the class and the data; predicting, using a second machine learning regression model, a tranche count for the original transaction based on the class and the data; and rebuilding the original transaction as one or more future transactions based on the class, the first tranche delay days, and the tranche count. Each of the one or more future transactions comprise an updated amount of the original transaction, an updated date upon which the original transaction is anticipated, or both. In some instances, the method further includes predicting, using a third machine learning regression model, a tranche interval for the original transaction based on the class, the tranche count, and the data, where the original transaction is rebuilt as the one or more future transactions based on the class, the first tranche delay days, the tranche count, and the tranche interval. In some instances, the method further includes calculating a cash position based on the one or more future transactions.

Advantageously, the techniques disclosed herein attempt to split and rebuild future transactions based on time, spread and interval (e.g., determine what is likely executed transaction structure) and derive the aggregated cash position from those rebuilt and split future transactions. Thus, the techniques are not confined to predicting the aggregated cash position explicitly from the original transaction data (i.e., the original promised transaction). Moreover, the transaction-based techniques allow the user or entity to filter predicted split transactions as per needs (e.g., business flexibility) and rebuild a new modified cashflow on-the fly. Another benefit attributable to the use of machine learning forecasting is the ability to be 'always on' in the sense that the predictions or forecasting can be programmed to update automatically on the most recent data. Typically, this means updating the forecast based on aggregate data on a daily or weekly basis, refreshing the data warehouse with each forecast refresh, and regenerating a running forecast based on the most recent actuals. New forecast accuracy and bias metrics can be calculated, the base and running forecast can be compared, and the updated results presented for review. An additional advantage of using the machine learning techniques is data processing speed. The machine learning techniques described herein have been designed to capitalize modern chip architectures, squeezing more calculations per second, making the best use of in-memory storage, and propelling machine learning forecasting to light-speed results. Testing has shown that the machine learning forecasting speeds can exceed one million forecasts per hour (data extracted, machine learning model fitting, scoring and storage of output predictions) with off-the-shelf hardware.

Conceptual Example of Predicting Transactions

Figure 3:
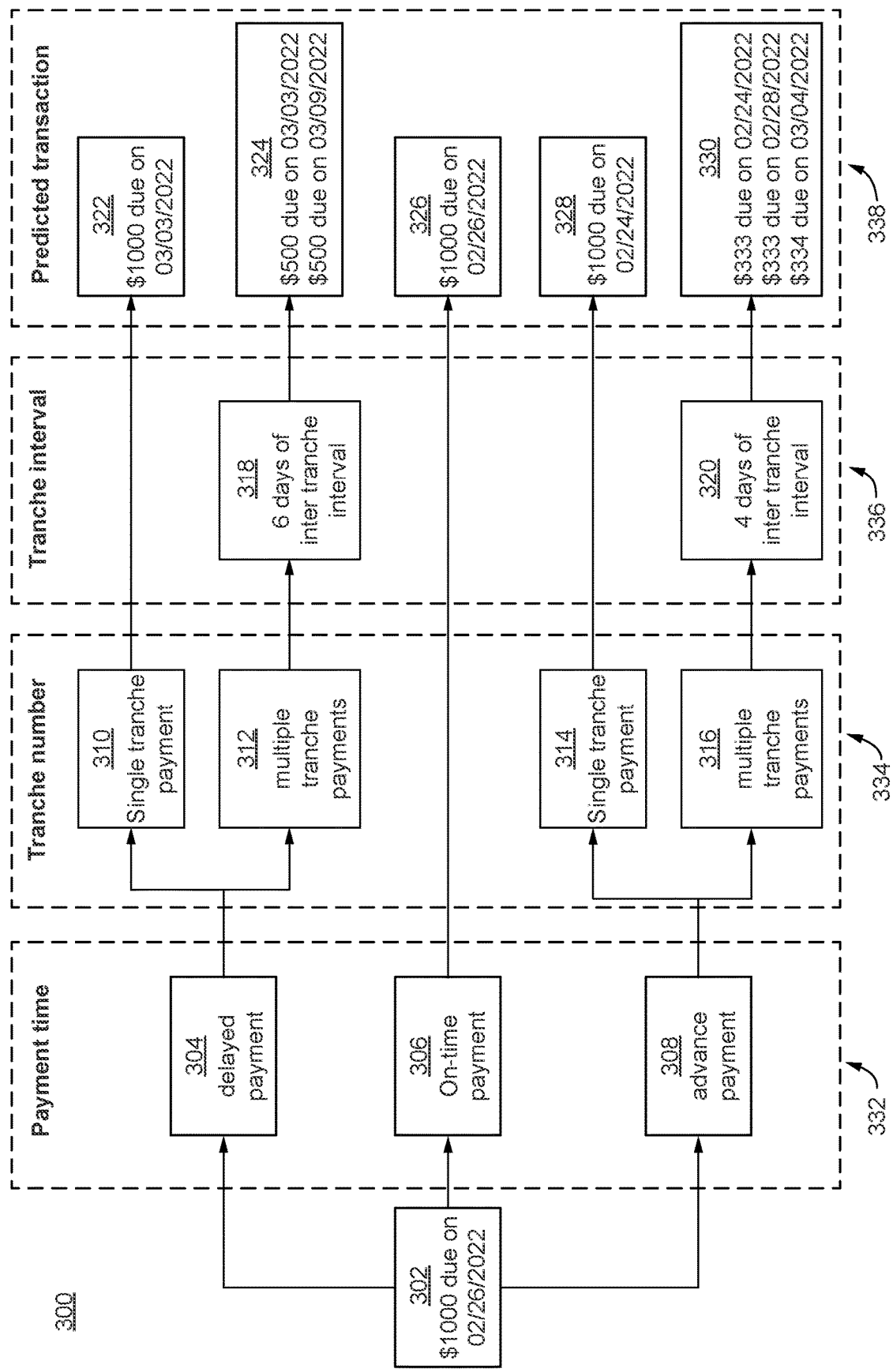
FIG. 3 depicts a solution approach concept for predicting transaction data and rebuilding a transaction in accordance with various embodiments.

FIG. 3 depicts a block diagram illustrating a conceptual example 300 of rebuilding future transactions from an original transaction in accordance with various embodiments. As demonstrated by example 300, a single transaction can either resemble the original transaction in terms of its predicted probability of combination of time, spread and interval or it can be split across a probabilistic outcome of time, spread and interval. The implementation of this approach is orchestrated across multiple machine learning models to rebuild a future likely executed transaction from an original transaction. In this particular example, a multi-class classification machine learning model is used to predict the time part of the future committed transaction, while regression models are used to predict the spread and interval.

Example 300 provides various simulated scenarios of using this combination of machine learning models to predict a future transaction (e.g., likely executed transaction) from an original transaction (e.g., original promised transaction). Example 300 begins with block 302, where an original transaction may include a receivable payment of $1000 that is due on Feb. 26, 2022. Through payment time classification module 332, the receivable payment of $1000 in the original transaction can be classified into three different scenarios related to payment time. A multi-class classification machine learning model may be employed as part of the classification module 332 and used to classify the original transaction into the various scenarios related to payment time. In one example, the scenarios may include a delayed payment time, on-time payment time, and early payment time, which means a predicted payment time after, on, and prior to the provisioned payment time, respectively. A scenario of delayed payment time is shown in block 304. In block 304, the receivable payment in the original transaction can be predicted to be delayed (e.g., delayed by 5 days) from the provisioned payment time. A scenario of on-time payment time prediction is shown in block 306. In block 306, the receivable payment in the original transaction can be predicted to be received on the provisioned payment time. A scenario of early payment time is shown in block 308. In block 308, the receivable payment in the original transaction can be predicted to be received prior to the provisioned payment time (e.g., a 2 day advanced payment).

Based on the three different scenarios related to the payment time of the receivable payment of $1000, the tranche number (a portion of something, especially money) that will be used to receive the full amount of the receivable payment can be predicted for each scenario via the tranche number prediction module 334. As used herein, when an action is "based on" something, this means the action is based at least in part on at least a part of the something. A regression machine learning model may be employed as part of the tranche number prediction module 334 and used to predict how the payment is to be settled, i.e., whether a payment will be received as a single tranche payment or will be received as multiple tranche payments (e.g., 2, 3, 4, 5, etc. payments). With reference to an example of the delayed scenario in block 304, a single tranche payment in block 310 can be predicted as one of the possible tranche numbers used to receive the receivable payment. Alternatively, multiple tranche payments (e.g., 2 tranche payments) in block 312 can be predicted as one of the possible tranche numbers used to receive the receivable payment. An example of the on-time scenario in block 306 is where no tranche numbers are predicted since only a one-time payment was predicted to be made on the provisioned payment time. With reference to an example of the early scenario in block 308, a single tranche payment in block 314 can be predicted as one of the possible tranche numbers used to receive the full amount of the receivable payment. Alternatively, multiple tranche payments (e.g., 3 tranche payments) in block 316 can be predicted as one of the possible tranche numbers used to receive the receivable payment.

Based on the predicted tranche numbers from the tranche number prediction module 334 for each scenario, a tranche interval module 336 can be used to predict a time interval or inter tranche gap between multiple tranche payments. A regression machine learning model may be employed as part of the tranche interval module 336 and used to predict inter tranche gap between multiple tranche payments. For example, in the delayed scenario, a inter tranche gap between the 2 tranche payments in block 312 can be predicted to be 6 days in block 318. As another example, in the early scenario, a time interval between the 3 tranche payments in block 316 can be predicted to be 4 days in block 320.

Based on the results of predicted payment time, tranche numbers, and time intervals for each scenario, a transaction module 338 can rebuild and predict a future transaction (e.g., likely executed transaction) from the original transaction in block 302. For example, according to the result of predicted tranche numbers and time intervals in the delayed scenario, the transaction prediction module 338 can predict a future transaction related to the receivable payment and time at block 322 or 324. In the example of block 322, the predicted transaction is being interpreted as the receivable payment of $1000 may be received on Mar. 3, 2022 in a single tranche payment. In the example of block 324, the predicted transaction is interpreted as the receivable payment of $500 may be received on Mar. 3, 2022 in the first tranche payment, and the remaining $500 may be received on Mar. 9, 2022 in the second tranche payment. In some examples, there may only be one predicted transaction in the on-time scenario. Thus, no predicted result of tranche number and tranche interval involved once the original transaction in block 302 has been classified into the on-time scenario using payment time classification module 332. And thus, only one future transaction in block 326 can be predicted by the transaction prediction module 338, which exhibits exactly the same transaction as the original transaction. According to the result of predicted tranche numbers and time intervals in the early scenario, the transaction prediction module 338 can also predict a future transaction related to the receivable payment and time at block 328 or 330. In an example of block 328, the predicted transaction is being interpreted as the receivable payment of $1000 may be received on Feb. 24, 2022 in a single tranche payment. In another example of block 330, the predicted transaction is being interpreted as the receivable payment of $333 may be received on Feb. 24, 2022 in the first tranche payment, the receivable payment of $333 may be received on Feb. 28, 2022 in the second tranche payment, and the remaining receivable payment $334 may be received on Mar. 4, 2022 in the third tranche payment.

Model Building Pipeline

Figure 4:
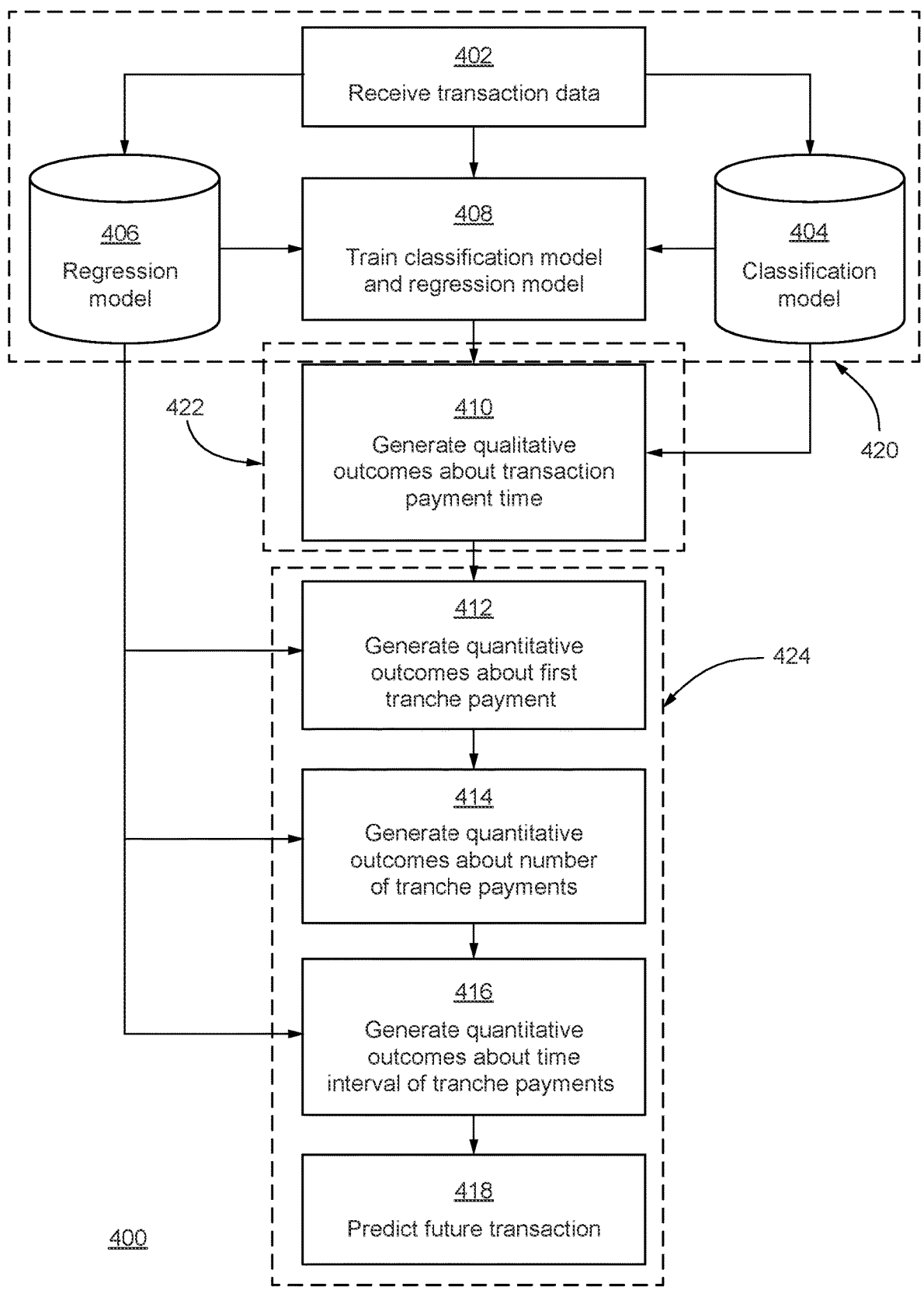
FIG. 4 depicts a block diagram illustrating a machine learning pipeline for predicting transaction data in accordance with various embodiments.

FIG. 4 depicts a block diagram illustrating a machine learning pipeline 400 used to predict transaction data in accordance with various embodiments. As shown in FIG. 4, the machine learning pipeline 400 may include various modules, including a model training module 420, a transaction classification module 422, and a transaction prediction module 424. In various embodiments, the model training module 420 is configured to build and train at least one classification model 404 and multiple regression models 406 to be used by the other modules. The model training module 420 can commence at block 402, where transaction data can be received and used as training data for training models in the machine learning pipeline 400. In some examples, the transaction data may be received from one or more entities, such as banks, merchants, or other parties in the business. In some examples, the transaction data can include transaction details. The transaction details can provide details in transaction events for a specified reporting period and include information, such as events description, transaction description, quantity/unit cost of labor, materials, and parties and counter parties to the transactions. In some instances, the transaction details include historical transaction details for the party and/or counterparty and currency, capturing earlier patterns prior to the current record, within a historical window size. For example, the transaction details may include historical payment details for the party and/or counterparty and currency, capturing earlier patterns prior to the current record, within a historical window size. The historical payment details can be the record of all the past payments from a party and/or counterparty and can include indications of whether the payment was paid on-time, late, or early, the number of tranches used to execute the payment, and the interval of time between tranches. Further, the transaction details may include historical receivable details for a party and/or counterparty, capturing earlier patterns prior to the current record, within a historical window size. The historical receivable details can be the record of all the past receivables by a party and/or counterparty and can include indications of whether the receivable was received on-time, late, or early, the number of tranches used to execute the receivable, and the interval of time between tranches.

At block 408, the model training module 420 can use the received transaction data in block 402 to train machine learning algorithms and generate the classification model 404 and the regression models 406. In some examples, the training process can involve statistical functions or mathematical functions performed programmatically. In general, the classification model 404 can be built with a supervised machine learning algorithm. In some examples, the classification model 404 can read input data (e.g., transaction data, transaction records, projected cash position, etc.) and generate an outcome that classifies the input data into at least one predetermined or non-predetermined category. For example, referring to FIG. 1, classification model 404 can read transaction data 404 in each transaction record in the transaction records 400 and classify each transaction record into either on-time, delay, or early payment category. Examples of classification model 404 can include Generative adversarial network (GAN), Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network).

In some examples, the regression model 406 can be used to provide some function that determines the relationship between one or more independent variables and dependent variables to generate or predict unknown dependent variables. For example, referring to FIG. 1, regression model 404 can read partial historical transaction data 104 in some transaction records in the transaction records 100 and predict the remaining transaction data in other transaction records in the transaction records 100. Examples of regression model 406 can include a convolutional neural network ("CNN"), e.g., an inception neural network, a residual neural network ("Resnet"), or a recurrent neural network, e.g., long short-term memory ("LSTM") models or gated recurrent units ("GRUs") models, other variants of Deep Neural Networks ("DNN").

In other examples, the classification model 404 and regression model 406 both can include at least one model for performing financial forecasting, a model for performing sales forecasting, and a model for predicting a cash position in a future transaction from a previous transaction. Still, other types of classification models or regression models may be implemented in other examples according to this disclosure.

In the training of the classification model 404 and regression model 406, the model training module 420 at block 408 may be comprised of two main components: dataset preparation module and model training framework. The dataset preparation module can perform processes on the transaction data, such as normalizing the transaction data and splitting the transaction data into training and validation datasets so that the system can train and test the models (e.g., classification model 404 and regression model 406). The splitting of the transaction data into training and validation datasets may be performed randomly or in accordance with a pre-determined configuration (e.g., a 90/10% or 70/30%).

The model training framework may perform the processes of determining hyperparameters for the models and performing iterative operations of inputting examples from the modified training dataset into the models to find a set of model parameters (e.g., weights and/or biases) that minimizes a cost function(s) such as loss or error function for the models The hyperparameters are settings that can be tuned or optimized to control the behavior of the models. Most models explicitly define hyperparameters that control different features of the models such as memory or cost of execution. However, additional hyperparameters may be defined to adapt the models to a specific scenario. For example, regularization weight, strength of weights or biases, the number of hidden units of a model, the learning rate of a model, the convolution kernel width, or the number of kernels, and the like. The cost function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the cost or loss function may be defined that measures the difference between the ground truth value for input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

Once the set of model parameters are identified, the models (e.g., classification model 404 and regression model 406) have been trained, and the pipeline 400 performs the additional processes of testing or validation using the subset of testing dataset (testing or validation dataset). The testing or validation processes include iterative operations of inputting examples from the subset of testing dataset into the models using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of the test dataset may be input into the models to obtain the output. For example, the obtained output in transaction classification module 422 can be a qualitative outcome about transaction payment time. Another example, the obtained output in transaction prediction module 424 can be a series of quantitative outcome transaction tranche payments, number of tranches, time interval among tranches, and predicted transaction data. This output is evaluated versus ground truth entities using correlation techniques such as Bland-Altman method and the Spearman's rank correlation coefficients. Further, the transaction data 104 in FIG. 1 may be calculated in the models training module 420 such as the error, accuracy, precision, recall, receiver operating characteristic curve (ROC), etc. The transaction data may be used in the model training module 420 to analyze the performance of either model (e.g., classification model 404 or regression models 406) for providing predictions.

After the classification model 404 and regression model 406 have been trained through the model training module 420, the pipeline 400 can classify transaction data using the classification model 404 with transaction data to generate qualitative outcomes about transaction payment time through the transaction classification module 422. At block 402, the transaction classification module 422 may generate one or more qualitative outcomes by analyzing the transaction data using the classification model 404. In one example, the qualitative outcomes may include various classified categories regarding the original transaction. Specifically, the classified categories may include temporal relationships between a predicted payment time and a provisioned payment time regarding the original transaction. For example, the temporal relationships between a predicted payment time and a provisioned payment time may include predicted payment time that occurs prior to provisioned payment time, predicted payment time occurs on the provisioned payment time, and predicted payment time occurs after provisioned payment time.

Based on the qualitative outcomes generated from the classification module 422, the pipeline 400 can proceed to predict further transaction detail in a future transaction through transaction prediction module 424. In blocks 412 to 416, pipeline 400 can generate a series of quantitative outcomes using one or more regression models 406. In one example, the series of quantitative outcomes may relate to transaction tranches, the number of tranches, and the time interval between tranches related to the original transaction. In block 412, one or more quantitative outcomes about the first tranche payment can be generated using the regression model based on the qualitative outcomes generated from block 410. In one example, the quantitative outcomes of the first tranche payment can be temporal values from a predicted payment time of a first payment tranche to a provisioned payment time in a transaction. In block 414, one or more quantitative outcomes about a number of tranche payments can be generated using the regression model 406 based on the quantitative outcomes generated from block 412. In one example, the quantitative outcomes about a number of tranche payments may correspond to different qualitative outcomes generated from block 410. At block 416, one or more quantitative outcomes about the time interval between transaction tranche payments can be generated using the regression model 406 based on the quantitative outcomes generated from block 414. In block 418, a future transaction can be predicted based on the qualitative outcomes generated from block 410 and the quantitative outcomes generated from blocks 412 to 416. In one example, the predicted future transaction data can be used for rebuilding one or more future transactions (e.g., likely executed transaction), wherein the one or more future transactions correspond to an outcome generated from blocks 410, 412, 414, 416, or any combination thereof. Thereafter, the one or more future transactions may be used, alone or in combination with other predicted future transactions, to predict a cash position for a user or entity.

Figure 5:
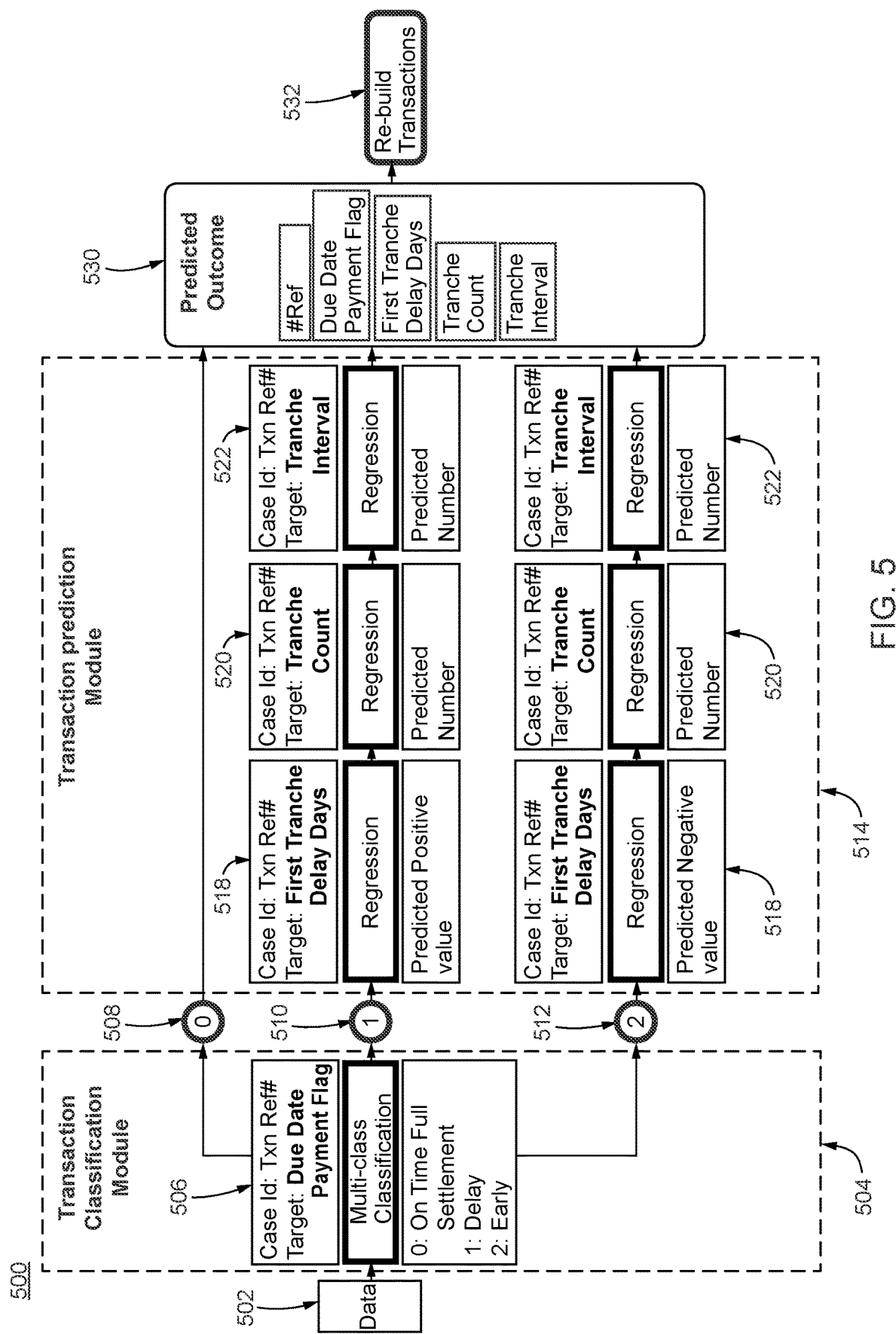
FIG. 5 depicts a block diagram illustrating a system for rebuilding a transaction in accordance with various embodiments.

Systems and Techniques for Rebuilding a Transaction and Predicting a Cash Position FIG. 5 depicts a block diagram of a system 500 for predicting future transaction data and rebuilding a future transaction from the predicted data in accordance with various embodiments. The system 500 includes a transaction classification module 504, transaction prediction module 514, and predicted outcomes module 530. In some examples, the transaction classification module 504 and transaction prediction module 514 are the classification module 332 and transaction prediction module 334 and 336 described with respect to FIG. 3 and configured to perform similar functions. The transaction classification module 504 and transaction prediction module 514 comprise classification and regression models, respectively, trained and deployed as described with respect classification model 404 and regression model 406 in the machine learning pipeline 400 of FIG. 4.

The system 500 starts at block 502, where data is obtained for an original transaction (e.g., an expected transaction—receivable or payable). In some examples, the data includes a transaction record reference number, an amount of a transaction, for example, an amount of cash to be paid or received, the date upon which the transaction is anticipated, for example, the date upon which an amount is anticipated to be paid or received, and the party (e.g., payor) and/or counterparty (e.g., payee) of the transaction. The data is input into the transaction classification module 504, which uses a multi-classification model 506 (e.g., the classification model 404) to classify the data into one of multiple classes (e.g., a due date payment flag). In some instances, the multi-class classification represents the timing for the original transaction (temporal aspects), including, for example, on-time, delay, and early. Each class may be associated with a numeral indicator (e.g., an integer). For example, an on-time payment class may be represented by the numeral indicator "0," a delayed payment class may be represented by the numeral indicator "1," and a early payment class may be represented by the numeral indicator "2." Each class corresponds to a scenario to be used by the system 500 for predictions of additional transaction data and/or a final predicted outcome to be used in rebuilding a likely transaction. For example, the numeral indicator "0" may correspond to an on-time payment scenario 508, the numeral indicator "1" may correspond to a delayed payment scenario 510, and the numeral indicator "2" may correspond to an early payment scenario 512. Examples of the possible scenarios are described in detail with respect to FIG. 3. Depending on the class predicted for the data by multi-classification model 506, subsequent operations are performed by the transaction prediction module 514 and the predicted outcomes module 530.

In the on-time payment scenario 508, there is no additional transaction data that needs to be predicted by the by the transaction prediction module 514 since the transaction is being classified as an on-time payment. Thus, the predicted outcomes module 530 would proceed to predict the outcome based on the classification of an on-time payment. The rebuilt transaction 532 would essentially match that of the expected transaction from the data obtained in block 502.

In the delayed scenario 510, the data is input into the transaction prediction module 514, which uses one or more regression models 518, 520, 522 (e.g., the regression model 406) to predict additional transaction data pertaining to spread and interval of the transaction. The regression model 518 is trained to predict a first tranche delay days, which is a number of days that at least a portion of the transaction (e.g., a first tranche) will be delayed from the expected transaction day within the data. The first tranche delay days may be represented as an output of a predicted positive value (e.g., +2, 3, 4, 5, etc.). The regression model 520 is trained to predict a tranche count, which is a number of tranches that will be used to execute the full amount of the transaction (e.g., 3 tranches may be used to execute payment of a given amount). The tranche count may be represented as an output of a predicted value (e.g., 2, 3, 4, 5, etc.). In instances where the tranche count>1 (multiple tranches are predicted to be used for executing the transaction), the data is input into the regression model 522. The regression model 522 is trained to predict a tranche interval, which is a period of time that is anticipated between tranches (e.g., 3 tranches may be used to execute payment of a given amount with 6 days anticipated between each tranche). The tranche interval may be represented as an output of a predicted value (e.g., 4, 5, 8, 9, 15 etc.).

In the early scenario 512, the data is input into the transaction prediction module 514, which uses one or more regression models 518, 520, 522 (e.g., the regression model 406) to predict additional transaction data pertaining to spread and interval of the transaction. The regression model 518 is trained to predict a first tranche delay days, which is a number of days that at least a portion of the transaction (e.g., a first tranche) will be advanced from the expected transaction day within the data. The first tranche delay days may be represented as an output of a predicted negative value (e.g., −2, −3, −4, −5, etc.). The regression model 520 is trained to predict a tranche count, which is a number of tranches that will be used to execute the full amount of the transaction (e.g., 3 tranches may be used to execute payment of a given amount). The tranche count may be represented as an output of a predicted value (e.g., 2, 3, 4, 5, etc.). In instances where the tranche count>1 (multiple tranches are predicted to be used for executing the transaction), the data is input into the regression model 522. The regression model 522 is trained to predict a tranche interval, which is a period of time that is anticipated between tranches (e.g., 3 tranches may be used to execute payment of a given amount with 6 days anticipated between each tranche). The tranche interval may be represented as an output of a predicted value (e.g., 4, 5, 8, 9, 15 etc.).

The outputs (transaction data) comprising the due date flag (class of the transaction), first tranche delay days, tranche count, tranche interval, or a combination thereof are grouped with the transaction record reference number from the obtained data. The outputs are then input into the predicted outcomes module 530. The predicted outcomes module 530 is configured to rebuild the original transaction as one or more future transactions or likely transactions comprising the amount of the transaction, the date upon which the transaction is anticipated, and the party (e.g., payor) and/or counterparty (e.g., payee) of the transaction. The amount of each transaction and the date upon which each transaction is anticipated are updated from the original transaction based on the due date flag (class of the transaction), first tranche delay days, tranche count, tranche interval, or the combination thereof. For example, with reference to the example shown in FIG. 3, if the original transaction was a receivable payment of $1000 that is due on Feb. 26, 2022, and the transaction data is determined to be: due date flag=delay, first tranche delay days=+5, and tranche count=1, then the rebuilt transaction would be a receivable payment of $1000 that is due on Mar. 3, 2022. As another example, with reference to the example shown in FIG. 3, if the original transaction was a receivable payment of $1000 that is due on Feb. 26, 2022, and the transaction data is determined to be: due date flag=early, first tranche delay days=−2, tranche count=3, and the tranche interval=4, then the rebuilt transactions would be a receivable payment of $333 that is due on Feb. 24, 2022, a receivable payment of $333 that is due on Feb. 28, 2022, and a receivable payment of $333 that is due on Mar. 4, 2022. Thereafter, the one or more future transactions may be used, alone or in combination with other predicted future transactions, to predict a cash position for a user or entity.

Figure 6:
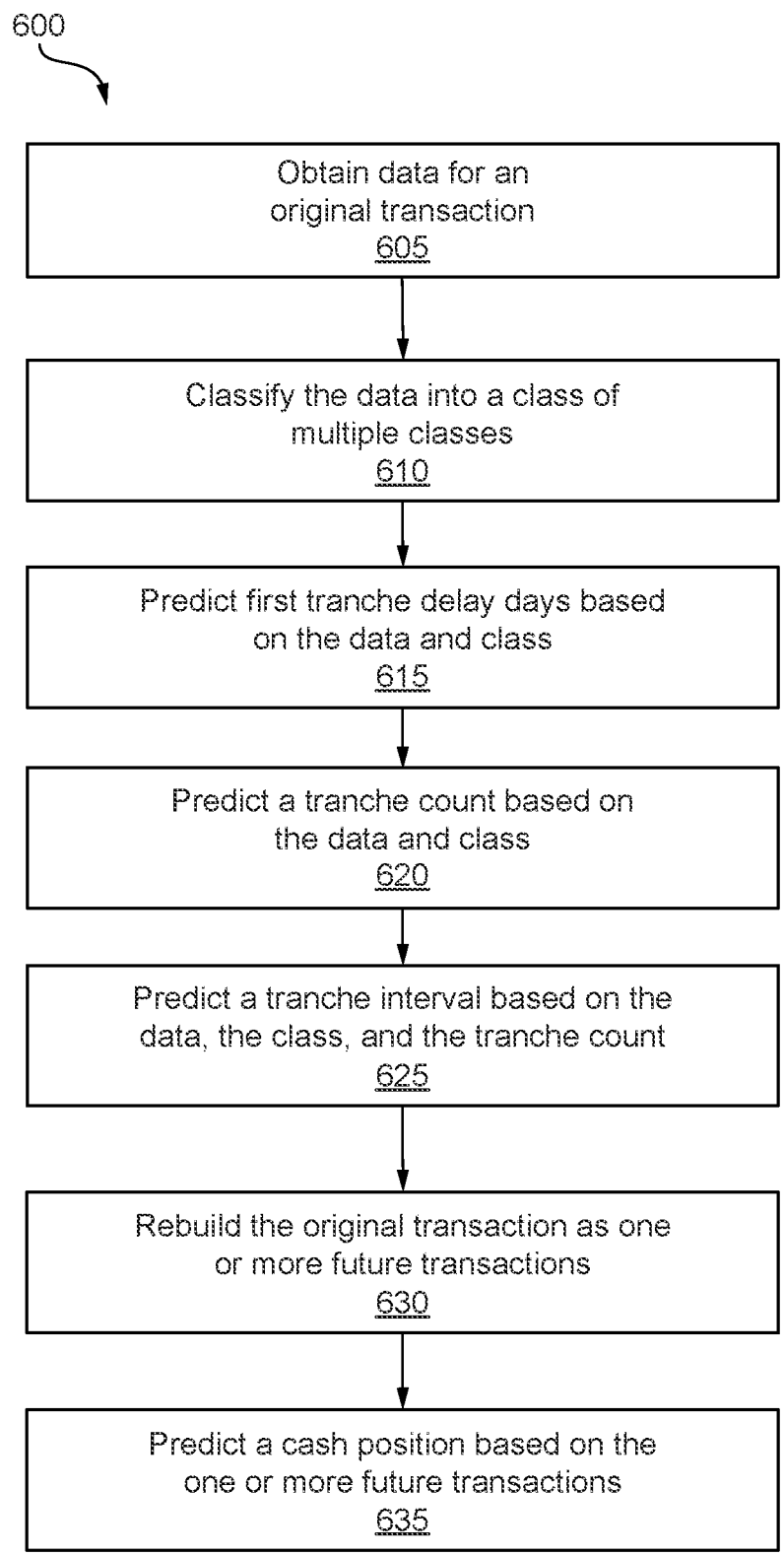
FIG. 6 depicts a flowchart illustrating a process for rebuilding a transaction and predicting a cash position in accordance with various embodiments.

FIG. 6 depicts a flowchart illustrating a process 600 for rebuilding a transaction and predicting a cash position in accordance with various embodiments. The process 600 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 4 and 5, the processing depicted in FIG. 6 may be performed by a computing environment (e.g., pipeline 400 and system 500) training, testing, and deploying machine learning models for rebuilding a transaction and predicting a cash position.

In step 605, data for an original transaction is obtained. The data comprises an amount of the original transaction, a date upon which the original transaction is anticipated, and a party, a counterparty, or both of the original transaction. In some instances, the data further comprises transaction record reference number to maintain an association between predicted transaction data and the original transaction.

In step 610, the original transaction is classified into a class of multiple classes based on the data. The classification is performed by a machine learning classification model. The multiple classes represent temporal aspects of the original transaction. For example, the multiple classes may comprise on-time full settlement, early, and delay. In some embodiments, the class of the original transaction is either early or delay. In other embodiments, the class of the original transaction is on-time full settlement.

In step 615, first tranche delay days are predicted for the original transaction based on the class and the data. The predication is performed by a first machine learning regression model. It should be understood that the class determined in step 610 drives downstream processing, and thus step 615 may or may not be performed depending on the class determined in step 610. For example, in response to the class being early or delay, the first tranche delay days is predicted for the original transaction; whereas in response to the class being on-time full settlement, the first tranche delay days is not predicted for the original transaction. The first tranche delay days are a positive number when the class is delay and the first tranche delay days are a negative number when the class is early.

In step 620, a tranche count is predicted for the original transaction based on the class and the data. The predication is performed by a second machine learning regression model. It should be understood that the class determined in step 610 drives downstream processing, and thus step 620 may or may not be performed depending on the class determined in step 610. For example, in response to the class being early or delay, the tranche count is predicted for the original transaction; whereas in response to the class being on-time full settlement, the tranche count is not predicted for the original transaction.

In step 625, a tranche interval is predicted for the original transaction based on the class, the tranche count, and the data. The predication is performed by a third machine learning regression model. It should be understood that the class determined in step 610 drives downstream processing, and thus step 625 may or may not be performed depending on the class determined in step 610. Moreover, the tranche count determined in step 620 drives downstream processing, and thus step 625 may or may not be performed depending on the tranche count determined in step 620. For example, when the class is early or delay and the tranche count is greater than one, a tranche interval is predicted for the original transaction based on the class, the tranche count, and the data; whereas when the class is early or delay and the tranche count is equal to one or when the class is on-time full settlement, a tranche interval is not predicted for the original transaction.

In step 630, the original transaction is rebuilt as one or more future transactions based on the class, the first tranche delay days, the tranche count, the tranche interval, or a combination thereof. Each of the one or more future transactions comprise an updated amount of the original transaction, an updated date upon which the original transaction is anticipated, or both. It should be understood that the class determined in step 610 and the tranche count determined in step 620 drive downstream processing, and thus the predicted transaction data (the class, the first tranche delay days, the tranche count, the tranche interval) used in step 630 to rebuild the original transaction is determined based on the outcome of steps 610-625.

In step 635, a cash position is calculated based on the one or more future transactions. The cash position may be calculated by estimating future payments and receivables at a given time or over a given period of time based on the one or more future transactions. Accordingly, the cash position is calculated based on the rebuilt transactions, which are the based upon predictions of the various machine learning models.

Illustrative Systems

Figure 7:
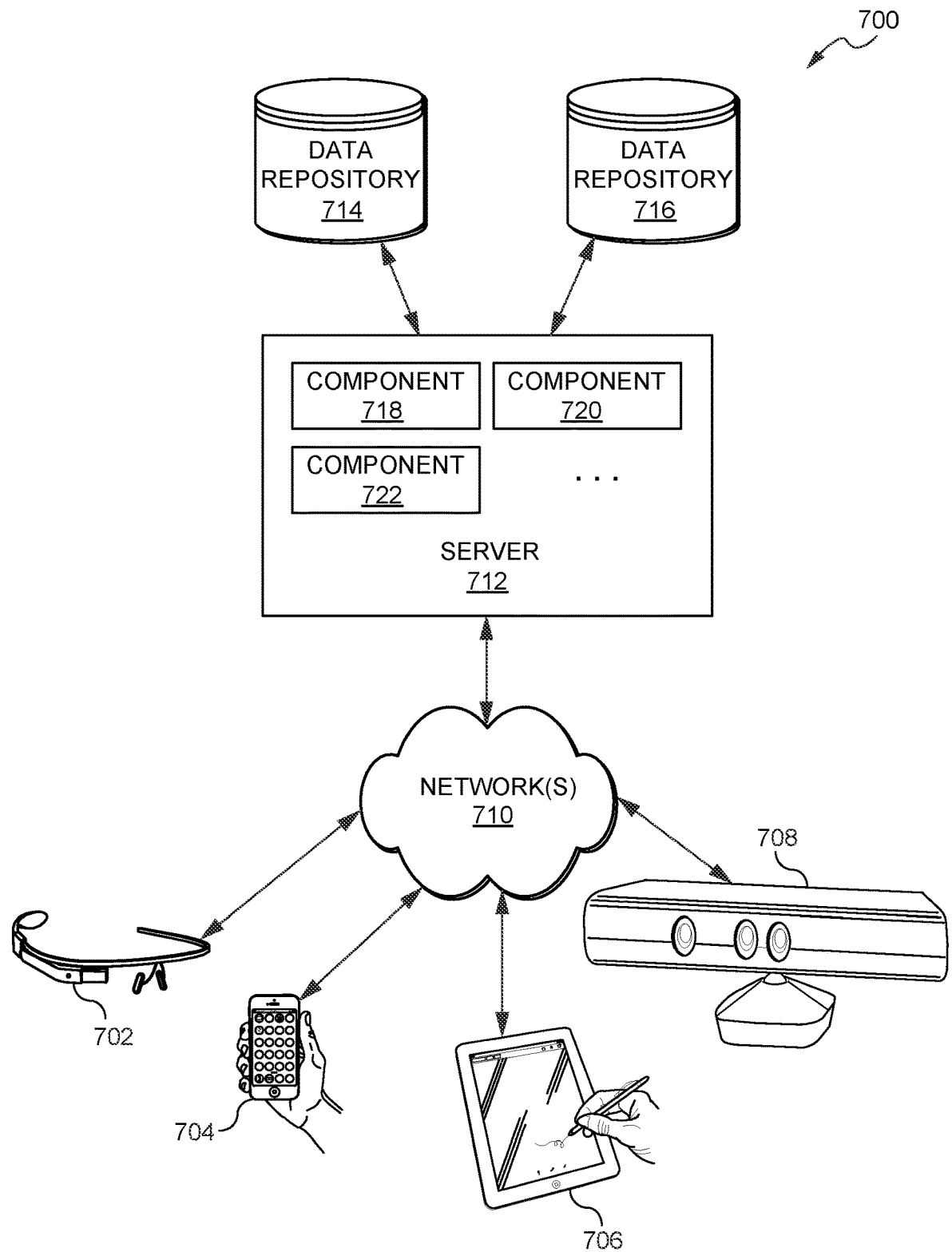
FIG. 7 depicts a simplified diagram of a distributed system for implementing various embodiments.

FIG. 7 depicts a simplified diagram of a distributed system 700. In the illustrated example, distributed system 700 includes one or more client computing devices 702, 704, 706, and 708, coupled to a server 712 via one or more communication networks 710. Clients computing devices 702, 704, 706, and 708 may be configured to execute one or more applications.

In various examples, server 712 may be adapted to run one or more services or software applications that enable one or more embodiments described in this disclosure. In certain examples, server 712 may also provide other services or software applications that may include non-virtual and virtual environments. In some examples, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The example shown in FIG. 7 is thus one example of a distributed system for implementing an example system and is not intended to be limiting.

Users may use client computing devices 702, 704, 706, and/or 708 to execute one or more applications, models or machine learning pipeline, which may generate one or more events or models that may then be implemented or serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 may include one or more virtual machines running virtual operating systems, or other computing architectures involving virtualization such as one or more flexible pools of logical storage devices that may be virtualized to maintain virtual storage devices for the server. In various examples, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain examples. For example, one or more of the data repositories 714, 716 may be used to store information such as information related to model performance or transaction data for use by a model based system used by server 712 when performing various functions in accordance with various embodiments. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain examples, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 714, 716 may also be used by applications to store application data. The data repositories used by applications may be of different types such as, for example, a key-value store repository, an object store repository, or a general storage repository supported by a file system.

Figure 8:
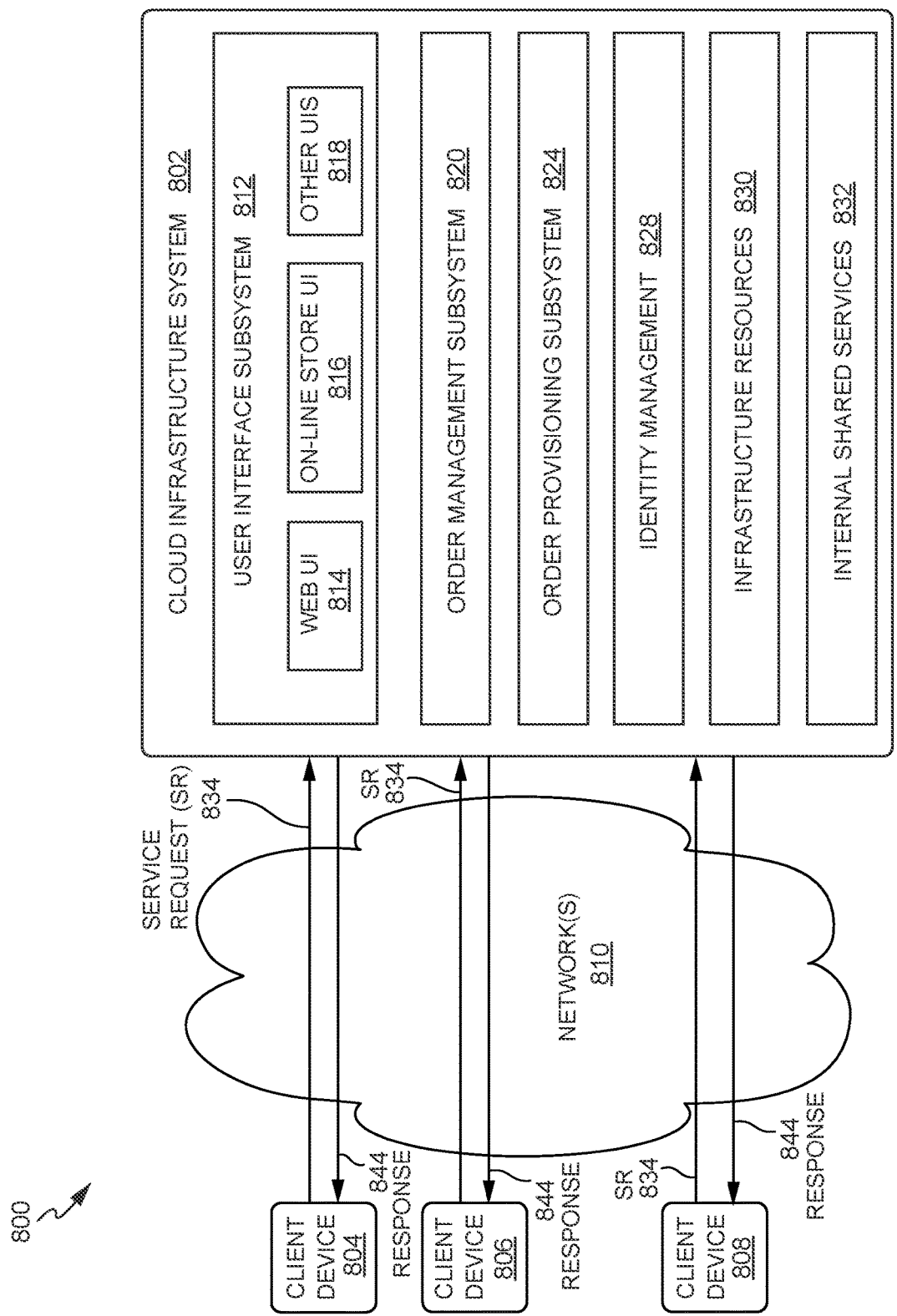
FIG. 8 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 8 is a simplified block diagram of a cloud-based system environment in which various services may be offered as cloud services in accordance with certain examples. In the example depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in some other examples, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative examples.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a user may request the cloud infrastructure system to take a certain action such as make a prediction, as described above, and/or provide services for a model based system as described herein. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer may be an individual or an enterprise. In certain other examples, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request information or action from a model based system as described in this disclosure.

In some examples, the processing performed by cloud infrastructure system 802 for providing services may involve model training and deployment. This analysis may involve using, analyzing, and manipulating datasets to train and deploy one or more models. This analysis may be performed by one or more processors, possibly processing the data in parallel, performing simulations using the data, and the like. For example, big data analysis may be performed by cloud infrastructure system 802 for generating and training one or more models for a model based system. The data used for this analysis may include structured data (e.g., data stored in a database or structured according to a structured model) and/or unstructured data (e.g., data blobs (binary large objects)).

As depicted in the example in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like. In certain examples, the storage virtual machines that are available for servicing storage requested from applications may be part of cloud infrastructure system 802. In other examples, the storage virtual machines may be part of different systems.

In certain examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a service offered by cloud infrastructure system 802. As part of the order, the customer may provide information identifying a model based system for which the service is to be provided and optionally one or more credentials for the model based system.

In certain examples, such as the example depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 802 as part of the provisioning process. Cloud infrastructure system 802 may generate an application ID and select a storage virtual machine for an application from among storage virtual machines provided by cloud infrastructure system 802 itself or from storage virtual machines provided by other systems other than cloud infrastructure system 802.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain examples, for a customer requesting the service, the response may include a model based system ID generated by cloud infrastructure system 802 and information identifying a model based system selected by cloud infrastructure system 802 for the model based system corresponding to the model based system ID.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain examples, cloud infrastructure system 802 comprises an identity management subsystem (IMS) 828 that is configured to manage customer information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
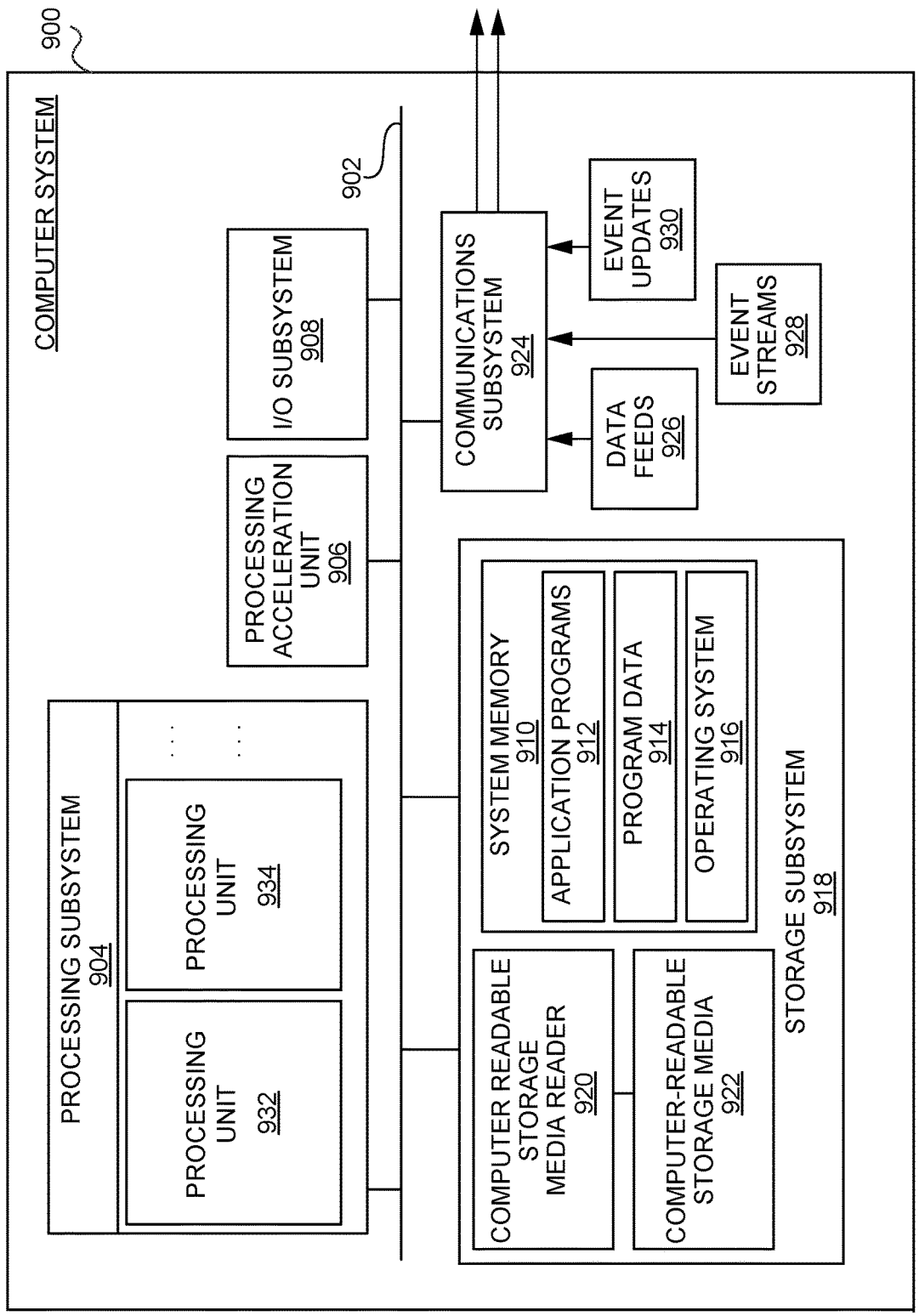
FIG. 9 illustrates an example computer system that may be used to implement various embodiments.

FIG. 9 illustrates an example of computer system 900. In some examples, computer system 900 may be used to implement any of the digital assistant or model based system within a distributed environment, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 may be organized into one or more processing units 932, 934, etc. A processing unit may include one or more processors, one or more cores from the same or different processors, a combination of cores and processors, or other combinations of cores and processors. In some examples, processing subsystem 904 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 904 may execute instructions stored in system memory 910 or on computer readable storage media 922. In various examples, the processing units may execute a variety of programs or code instructions and may maintain multiple concurrently executing programs or processes. At any given time, some or all of the program code to be executed may be resident in system memory 910 and/or on computer-readable storage media 922 including potentially on one or more storage devices. Through suitable programming, processing subsystem 904 may provide various functionalities described above. In instances where computer system 900 is executing one or more virtual machines, one or more processing units may be allocated to each virtual machine.

In certain examples, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some examples. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide authentication in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some examples. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 918 may also include a computer-readable storage media reader 920 that may further be connected to computer-readable storage media 922. Reader 920 may receive and be configured to read data from a memory device such as a disk, a flash drive, etc.

In certain examples, computer system 900 may support virtualization technologies, including but not limited to virtualization of processing and memory resources. For example, computer system 900 may provide support for executing one or more virtual machines. In certain examples, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, when computer system 900 is used to implement bot system 120 depicted in FIG. 1, the communication subsystem may be used to communicate with a model based system selected for an application.

Communication subsystem 924 may support both wired and/or wireless communication protocols. In certain examples, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 924 may provide wired network connectivity (e.g., Ethernet) in addition to or instead of a wireless interface.

Communication subsystem 924 may receive and transmit data in various forms. In some examples, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 924 may be configured to receive data in the form of continuous data streams, which may include event streams 928 of real-time events and/or event updates 930, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
  training machine learning algorithms using a training dataset to generate a machine learning classification model, the training dataset constructed based on historical transaction data comprising historical transaction attributes for a plurality of historical transactions, wherein the machine learning classification model is configured to, provided as an input a set of transaction attributes associated with a given transaction, output, for the given transaction, a prediction indicating a temporal class among a plurality of temporal classes including an early class, an on time class, and a delay class;
  training a first machine learning model using the training dataset to generate a first machine learning regression model, wherein the first machine learning regression model is configured to, provided as an input the set of transaction attributes associated with the given transaction and the temporal class of the given transaction, output a prediction of tranche delay days for the given transaction, wherein the first machine learning model includes one of a convolutional neural network, a recurrent neural network, or a deep neural network;
  training a second machine learning model using the training dataset to generate a second machine learning regression model, wherein the second machine learning regression model is configured to, provided as an input the set of transaction attributes associated with the given transaction and the temporal class of the given transaction, output a prediction of a tranche count for the given transaction, wherein the second machine learning model includes one of a convolutional neural network, a recurrent neural network, or a deep neural network;
  receiving, by a processor, a data record for an original transaction, wherein the data record comprises original transaction attributes including an amount of the original transaction, an original date upon which the original transaction is anticipated, and a party, a counterparty, or both to the original transaction;
  inputting, by the processor, the original transaction attributes into the machine learning classification model to obtain a prediction of a temporal class for the original transaction, the temporal class comprising one from among the early class and the delay class;
  inputting, by the processor into the first machine learning regression model, the original transaction attributes and information indicating the temporal class for the original transaction, to obtain a prediction of first tranche delay days, the first tranche delay days being a predicted temporal deviation from the original date for the original transaction, the temporal class having been obtained from the machine learning classification model;
  inputting, by the processor, into the second machine learning regression model, the original transaction attributes and the information indicating the temporal class for the original transaction, to obtain a prediction of a tranche count for the original transaction, the temporal class having been obtained from the machine learning classification model;
  rebuilding, by the processor, the original transaction as one or more future transactions, the rebuilding comprising:
    determining at least one updated transaction attribute respectively corresponding to each of the one or more future transactions based on at least the temporal class output by the machine learning classification model for the original transaction, the first tranche delay days output by the first machine learning regression model for the original transaction, and the tranche count output by the second machine learning regression model for the original transaction, the at least one updated transaction attribute comprising one of an updated transaction amount with respect to the original transaction, an updated date upon which the updated transaction amount is anticipated, or both, and
    generating an updated data record with regard to the original transaction so that the updated data record comprises, for each of the one or more future transactions, the at least one updated transaction attribute and at least one original transaction attribute among the original transaction attributes;
  calculating, by the processor, a cash position based on the one or more future transactions; and
  outputting, by the processor, the updated data record respectively corresponding to each of the one or more future transactions, the cash position, or both to an output device,
  wherein the original transaction is processed as the one or more future transactions.

2. The method of claim 1, further comprising predicting, using a third machine learning regression model, a tranche interval for the original transaction based on the temporal class, the tranche count, and the original transaction attributes, wherein the original transaction is rebuilt as the one or more future transactions based on the temporal class, the first tranche delay days, the tranche count, and the tranche interval.

3. The method of claim 1, wherein the first tranche delay days are a positive number when the temporal class is the delay class and the first tranche delay days are a negative number when the temporal class is the early class.

4. The method of claim 1, wherein:
when the tranche count is greater than one, predicting, using a third machine learning regression model, a tranche interval for the original transaction based on the original transaction attributes, and the original transaction is rebuilt as the one or more future transactions based on the temporal class, the first tranche delay days, the tranche count, and the tranche interval, and
when the tranche count is equal to one, the tranche interval is not predicted, and the original transaction is rebuilt as one future transaction of the one or more future transactions.

5. A computing system comprising:
a processor; and
a memory coupled to the processor, the memory storing a plurality of instructions executable by the processor, the plurality of instructions, when executed by the processor, cause the processor to perform processing including:
training machine learning algorithms using a training dataset to generate a machine learning classification model, the training dataset constructed based on historical transaction data comprising historical transaction attributes for a plurality of historical transactions, wherein the machine learning classification model is configured to, provided as an input a set of transaction attributes associated with a given transaction, output, for the given transaction, a prediction indicating a temporal class among a plurality of temporal classes including an early class, an on time class, and a delay class;
training a first machine learning model using the training dataset to generate a first machine learning regression model, wherein the first machine learning regression model is configured to, provided as an input the set of transaction attributes associated with the given transaction and the temporal class of the given transaction, output a prediction of tranche delay days for the given transaction, wherein the first machine learning model includes one of a convolutional neural network, a recurrent neural network, or a deep neural network;
training a second machine learning algorithms using the training dataset to generate a second machine learning regression model, wherein the second machine learning regression model is configured to, provided as an input the set of transaction attributes associated with the given transaction and the temporal class of the given transaction, output a prediction of a tranche count for the given transaction, wherein the second machine learning model includes one of a convolutional neural network, a recurrent neural network, or a deep neural network;
receiving a data record for an original transaction, wherein the data record comprises original transaction attributes including an amount of the original transaction, an original date upon which the original transaction is anticipated, and a party, a counterparty, or both to the original transaction;
inputting the original transaction attributes into the machine learning classification model to obtain a prediction of a temporal class for the original transaction, the temporal class comprising one from among the early class and the delay class;
inputting, into the first machine learning regression model, the original transaction attributes and information indicating the temporal class for the original transaction, to obtain a prediction of first tranche delay days, the first tranche delay days being a predicted temporal deviation from the original date for the original transaction, the temporal class having been obtained from the machine learning classification model;
inputting into the second machine learning regression model, the original transaction attributes and the information indicating the temporal class for the original transaction, to obtain a prediction of a tranche count for the original transaction, the temporal class having been obtained from the machine learning classification model;
rebuilding the original transaction as one or more future transactions, the rebuilding including:
determining at least one updated transaction attribute respectively corresponding to each of the one or more future transactions based on at least the temporal class output by the machine learning classification model for the original transaction, the first tranche delay days output by the first machine learning regression model for the original transaction, and the tranche count output by the second machine learning regression model for the original transaction, the at least one updated transaction attribute comprising one of an updated transaction amount with respect to the original transaction, an updated date upon which the updated transaction amount is anticipated, or both, and
generating an updated data record with regard to the original transaction so that the updated data record comprises, for each of the one or more future transactions, the at least one updated transaction attribute and at least one original transaction attribute among the original transaction attributes;
calculating a cash position based on the one or more future transactions; and
outputting the updated data record respectively corresponding to each of the one or more future transactions, the cash position, or both to an output device, wherein the original transaction is processed as the one or more future transactions.

6. The computing system of claim 5, wherein the processing further includes predicting, using a third machine learning regression model, a tranche interval for the original transaction based on the temporal class, the tranche count, and the original transaction attributes, wherein the original transaction is rebuilt as the one or more future transactions based on the temporal class, the first tranche delay days, the tranche count, and the tranche interval.

7. The computing system of claim 5, wherein the first tranche delay days are a positive number when the temporal class is delay and the first tranche delay days are a negative number when the temporal class is early.

8. The computing system of claim 5, wherein:
when the tranche count is greater than one, predicting, using a third machine learning regression model, a tranche interval for the original transaction based on the original transaction attributes, and the original transaction is rebuilt as the one or more future transactions based on the temporal class, the first tranche delay days, the tranche count, and the tranche interval, and when the tranche count is equal to one, the tranche interval is not predicted, and the original transaction is rebuilt as the one or more future transactions based on the temporal class, the first tranche delay days, and the tranche count.

9. A non-transitory computer-readable medium storing a plurality of instructions executable by one or more processors, the plurality of instructions, when executed by the one or more processors, cause the one or more processors to perform processing including:

training machine learning algorithms using a training dataset to generate a machine learning classification model, the training dataset constructed based on historical transaction data comprising historical transaction attributes for a plurality of historical transactions, wherein the machine learning classification model is configured to, provided as an input a set of transaction attributes associated with a given transaction, output, for the given transaction, a prediction indicating a temporal class among a plurality of temporal classes including an early class, an on time class, and a delay class;

training a first machine learning model using the training dataset to generate a first machine learning regression model, wherein the first machine learning regression model is configured to, provided as an input the set of transaction attributes associated with the given transaction and the temporal class of the given transaction, output a prediction of tranche delay days for the given transaction, wherein the first machine learning model includes one of a convolutional neural network, a recurrent neural network, or a deep neural network;

training a second machine learning model using the training dataset to generate a second machine learning regression model, wherein the second machine learning regression model is configured to, provided as an input the set of transaction attributes associated with the given transaction and the temporal class of the given transaction, output a prediction of a tranche count for the given transaction, wherein the second machine learning model includes one of a convolutional neural network, a recurrent neural network, or a deep neural network;

receiving a data record for an original transaction, wherein the data record comprises original transaction attributes including an amount of the original transaction, an original date upon which the original transaction is anticipated, and a party, a counterparty, or both to the original transaction;

inputting the original transaction attributes into the machine learning classification model to obtain a prediction of a temporal class for the original transaction, the temporal class comprising one from among the early class and the delay class;

inputting, into the first machine learning regression model, the original transaction attributes and information indicating the temporal class for the original transaction, to obtain a prediction of first tranche delay days, the first tranche delay days being a predicted temporal deviation from the original date for the original transaction, the temporal class having been obtained from the machine learning classification model;

inputting into the second machine learning regression model, the original transaction attributes and the information indicating the temporal class for the original transaction, to obtain a prediction of a tranche count for the original transaction, the temporal class having been obtained from the machine learning classification model;

rebuilding the original transaction as one or more future transactions, the rebuilding including:

determining at least one updated transaction attribute respectively corresponding to each of the one or more future transactions based on at least the temporal class output by the machine learning classification model for the original transaction, the first tranche delay days output by the first machine learning regression model for the original transaction, and the tranche count output by the second machine learning regression model for the original transaction, the at least one updated transaction attribute comprising one of an updated transaction amount with respect to the original transaction, an updated date upon which the updated transaction amount is anticipated, or both, and generating an updated data record with regard to the original transaction so that the updated data record comprises, for each of the one or more future transactions, the at least one updated transaction attribute and at least one original transaction attribute among the original transaction attributes;

calculating a cash position based on the one or more future transactions; and outputting the updated data record respectively corresponding to each of the one or more future transactions, the cash position, or both to an output device, wherein the original transaction is processed as the one or more future transactions.

10. The non-transitory computer-readable medium of claim 9, wherein the processing further includes predicting, using a third machine learning regression model, a tranche interval for the original transaction based on the temporal class, the tranche count, and the original transaction attributes, wherein the original transaction is rebuilt as the one or more future transactions based on the temporal class, the first tranche delay days, the tranche count, and the tranche interval.

11. The non-transitory computer-readable medium of claim 9, wherein the first tranche delay days are a positive number when the temporal class is delay and the first tranche delay days are a negative number when the temporal class is early.

12. The non-transitory computer-readable medium of claim 9, wherein:

when the tranche count is greater than one, predicting, using a third machine learning regression model, a tranche interval for the original transaction based on the original transaction attributes, and the original transaction is rebuilt as the one or more future transactions based on the temporal class, the first tranche delay days, the tranche count, and the tranche interval, and when the tranche count is equal to one, the tranche interval is not predicted, and the original transaction is rebuilt as the one or more future transactions based on the temporal class, the first tranche delay days, and the tranche count.

* * * * *